United States Patent [19]
Garrison

[11] Patent Number: 5,391,966
[45] Date of Patent: Feb. 21, 1995

[54] STARTING AND OPERATING CIRCUIT FOR ARC DISCHARGE LAMP

[76] Inventor: Robert L. Garrison, P.O. Box 394, Rte. 114, Henniker, N.H. 03242

[21] Appl. No.: 129,559

[22] Filed: Sep. 30, 1993

Related U.S. Application Data

[63] Continuation-in-part of Ser. No. 928,553, Aug. 11, 1992, abandoned.

[51] Int. Cl.6 ............................................. H05B 37/00
[52] U.S. Cl. ................................... 315/308; 315/224; 315/82; 315/DIG. 7
[58] Field of Search ............... 315/287, 289, 291, 308, 315/DIG. 7, 208, 205, 224, 82, 307

[56] References Cited

U.S. PATENT DOCUMENTS

| | | | |
|---|---|---|---|
| 5,036,256 | 7/1991 | Garrison et al. | 315/308 |
| 5,051,665 | 9/1991 | Garrison et al. | 315/287 |
| 5,142,203 | 8/1992 | Oda et al. | 315/224 |
| 5,151,631 | 9/1992 | Oda et al. | 315/82 |

FOREIGN PATENT DOCUMENTS

2120873 12/1983 United Kingdom ................ 315/224

Primary Examiner—Robert J. Pascal
Assistant Examiner—Michael B. Shingleton
Attorney, Agent, or Firm—Carlo S. Bessone

[57] ABSTRACT

A circuit for starting and operating a high intensity discharge (HID) lamp in a dc mode includes a dc-to-dc converter coupled to a pair of direct current input terminals. The dc-to-dc converter includes a semiconductor switch, a power transformer, input and output capacitors and a diode rectifier. A pulse width modulator is coupled to the dc-to-dc converter and includes a high frequency generator for developing a signal for driving the semiconductor switch of the dc-to-dc converter. A reverse recovery circuit coupled to the diode rectifier of the dc-to-dc converter reduces heat losses, eliminates noise and also returns energy to the input of the dc-to-dc converter. The starting and operating circuit further includes voltage and current sensing circuits coupled to a power control summing amplifier. The output of the power control summing amplifier is coupled to the pulse width modulator so as to control the power delivered to the lamp. A warm-up power control circuit allows operation of the lamp at an elevated power level for a predetermined period of time during start-up of the lamp. Also, the warm-up power control circuit includes circuitry for tracking the amount of time the lamp is off and for adjusting the initial lamp power to a hot lamp to a predetermined level.

9 Claims, 2 Drawing Sheets

STARTING AND OPERATING CIRCUIT FOR ARC DISCHARGE LAMP

This application is a continuation-in-part of application Ser. No. 07/928,553, filed on Aug. 11, 1992, now abandoned.

FIELD OF THE INVENTION

This invention relates to electrical circuits for starting and operating arc discharge lamps, such as high intensity discharge (HID) lamps. This invention is particularly useful with miniature metal halide lamps intended for use in automotive applications, such as headlights.

BACKGROUND OF THE INVENTION

U.S. Pat. Nos. 5,036,256 and 5,051,665, which issued to Garrison et al and are assigned to the same assignee as the present invention, relate to circuits for starting and operating an HID lamp in a dc mode.

Although these circuits have been employed successfully, it has been found that certain disadvantages do exist which leave something to be desired. Since the voltage of a HID lamp can vary greatly from lamp to lamp both during warm up and during normal operation, a circuit that adjusts lamp power according to only the lamp voltage during warm up, cannot provide adequate performance.

SUMMARY OF THE INVENTION

It is, therefore, an object of the present invention to obviate the disadvantages of the prior art.

It is still another object of the invention to provide an improved starting and operating circuit for low voltage applications such as a ballast for HID automotive headlights.

It is another object of the invention to provide a starting and operating circuit wherein the light output from a lamp operating on the circuit is not dependent upon variations in lamp voltage for different lamps.

These objects are accomplished in one aspect of the invention by the provision of a circuit for starting and operating an arc discharge lamp comprising a dc-to-dc converter coupled to first and second direct current input terminals and includes a semiconductor switch, a first transformer having a primary winding coupled to a first capacitor and a secondary winding coupled to a second capacitor, and a first diode having one end thereof coupled to the second capacitor. The circuit further comprises a pulse width modulator including a high frequency generator for developing a signal for driving the semiconductor switch of the dc-to-dc converter. A reverse recovery circuit includes a second diode, a filter capacitor and a second transformer having a primary winding and a secondary winding. The primary winding of the second transformer is connected in series with the first diode of the dc-to-dc converter. The secondary winding of the second transformer is coupled to the second diode and the filter capacitor. The output of the reverse recovery circuit is coupled to the input of the dc-to-dc converter. A power control summing amplifier is coupled to the dc-to-dc converter and has first and second inputs. The circuit further comprises voltage and current sensing circuits for developing a pair of control signals and means for coupling the control signals respectively to the first and second inputs of the power control summing amplifier. A warm-up power control circuit for operating an arc discharge lamp at an elevated power level for a predetermined period of time during start-up of the lamp includes means for tracking the amount of time the lamp is off and means for adjusting the initial lamp power to a hot lamp to a level between a rated lamp wattage and a maximum cold start wattage.

In accordance with further aspects of the present invention, the starting and operating circuit further comprises a input current sensing circuit including a third transformer having a primary winding in series with the semiconductor switch of the dc-to-dc converter and a fourth transformer having a primary winding in series with the first capacitor of the dc-to-dc converter. The first and second transformers have secondary windings coupled to the warm-up power control circuit.

In accordance with still further teachings of the present invention, one end of the second diode of the reverse recovery circuit is connected to one end of the secondary winding of the second transformer. The other end of the second diode is connected to one end of the filter capacitor. The other end of the filter capacitor is coupled to the other end of the secondary winding of the second transformer.

In accordance with further teachings of the present invention, the warm-up power control circuit includes a pair of timers, each of which comprises a resistor and a capacitor.

In accordance with still further aspects of the present invention, the second and third transformers of the input current sensing circuit have a primary-to-secondary ratio of 1:100.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
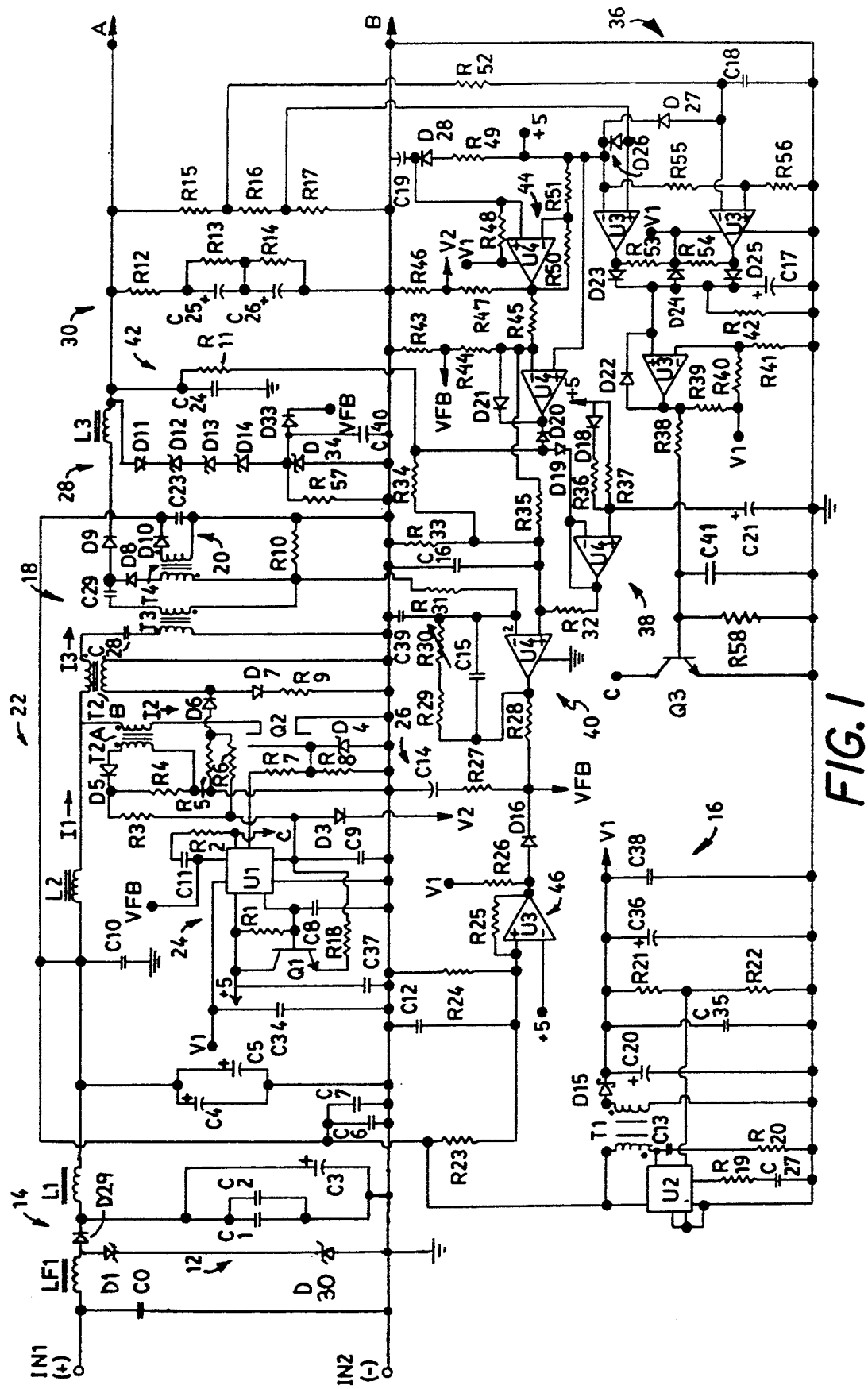
FIGS. 1 and 2 represent a schematic diagram of a preferred embodiment of an improved starting and operating circuit for an arc discharge lamp in accordance with the present invention.
Figure 2:
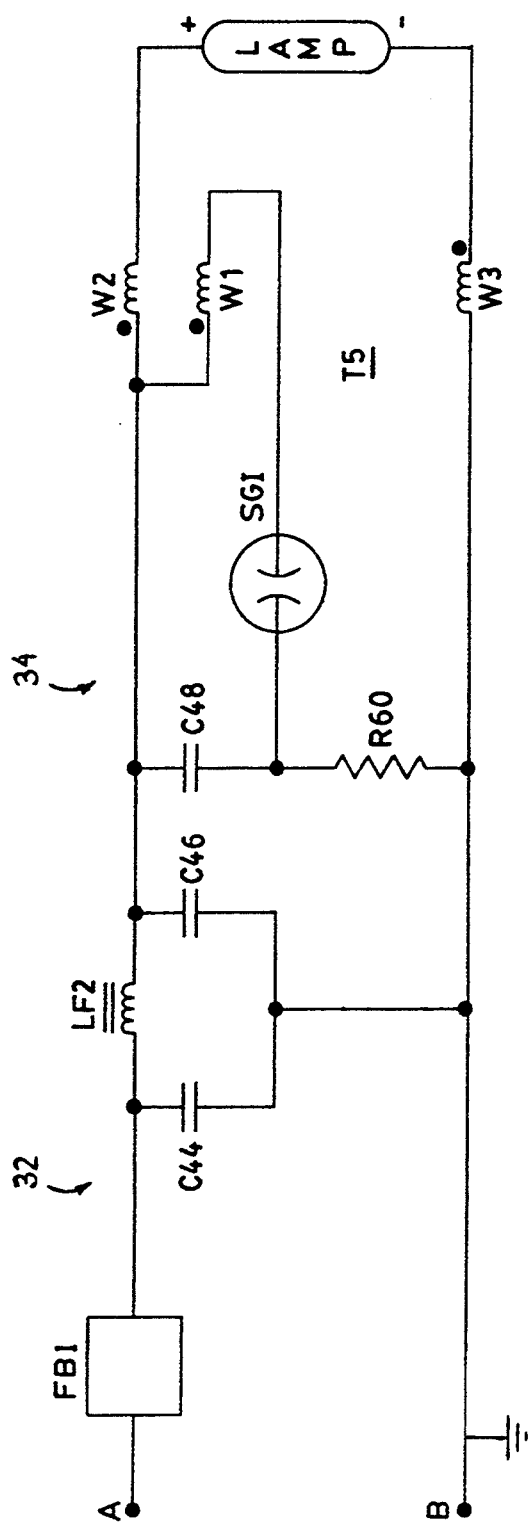

Reference is made to FIGS. 1 and 2 which illustrates a detailed schematic diagram of a preferred embodiment of a circuit for starting and operating an arc discharge lamp according to the present invention. The lamp may be a miniature, low-wattage, metal halide HID lamp suitable for use as an automotive headlight. Typically, the lamp wattage of such lamps is from about 30–35 watts. The lamp includes an envelope (i.e., quartz) containing an anode and a cathode (not shown). A fill material including sodium, scandium, mercury, iodine and xenon at a pressure of approximately 8 atmospheres (cold) may be contained within the envelope. After the lamp has been operated for a period of time, the pressure within the envelope may be as high as 80 atmospheres and the wall temperature may be 1000 degrees Celsius. These lamp conditions are partly responsible for the difficulty in attempting to hot restart the lamp.

The starting and operating circuit includes a pair of input terminals IN1 and IN2 formed for connection to a dc voltage source from about 6 to 18 volts dc. A positive input terminal IN1 is coupled through an inductor LF1 to one end of an input over-voltage protection circuit 12 consisting of a series connection of a pair of zener diodes D1, D30. One end of a reverse voltage protection device consisting of a diode D29 is connected to the junction of inductor LF1 and diode D1. The other end of diode D29 is connected to a RFI filter 14 consisting of capacitors C0, C1, C2, C3, C6, C7 and inductors LF1 and L1. Input filtering is provided by a parallel combination of electrolytic capacitors C4 and C5.

A regulated power supply 16 for providing 13 volts dc to control circuitry of the starting and operating circuit includes an integrated circuit U2 having a unregulated dc input at pin 5 connected to the positive terminal of electrolytic capacitors C4 and C5. Pin 2 of U2 is connected to ground through a series combination of a resistor R19 and a capacitor C27. A primary winding of a 1:1 ratio transformer T1 is connected to pins 5 and 7 of U2. The lower end of the primary winding of transformer T1 is connected to a series combination of a capacitor C13 and a resistor R20. A secondary winding of transformer T1 is coupled through a diode D15 to a parallel combination of output capacitors C20, C35, C36 and C38. A voltage divide network consisting of resistors R21 and R22 is connected across the output capacitors of the regulated power supply and has a junction connected to pin 3 of U2.

The unregulated dc voltage across input filter capacitors C4 and C5 is coupled to a dc-to-dc converter 18 including a first inductance L2 having one end connected to the positive junction terminal of input filter capacitors C4 and C5. The other end of first inductance L2 is coupled to the drain terminal of a semiconductor switch Q2 and to a first storage capacitor C28. The source terminal of semiconductor switch Q2 is connected to ground. The other end of first storage capacitor C28 is connected to one side of a primary winding of a power transformer T3. The other end of the primary winding of power transformer T3 is connected to ground. One end of a secondary winding on power transformer T3 is connected to one end of a second storage capacitor C29. The other end of the secondary winding of power transformer T3 is coupled to ground through a 1 ohm lamp current-sensing resistor R10. The other end of second capacitor C29 is connected to the junction of a pair of diodes D8, D9. The cathode of diode D9 is connected to one end of a second inductance L3. A capacitor C24 is connected between the other end of inductance L3 and ground.

During operation of dc-to-dc converter 18, diode D8 conducts current in the reverse direction for a short period of time (e.g., approximately $30 \times 10^{-9}$ seconds) when power transformer T3 reverses polarity as semiconductor switch Q2 turns on. The conduction of diode D8 produces heat losses and an amount of ringing in the circuit due to a reverse recovery current spike. It is an important aspect of the present invention to reduce the heat losses and to eliminate ringing (i.e., noise) associated with diode D8. Accordingly, the starting and operating circuit includes a reverse recovery circuit 20 consisting of a 1:1 ratio transformer T4, a diode D10 and a capacitor C23 is added. A primary winding of transformer T4 is connected between diode D8 and lamp current-sensing resistor R10. The voltage developed across a secondary winding of transformer T4 is rectified by diode D10 and filtered by capacitor C23. In addition to reducing heat losses and eliminating noise, reverse recovery circuit 20 returns the energy that would normally be lost to the input of dc-to-dc converter 18.

While it is known that current can be monitored in a circuit by measuring the voltage across a series resistor, the introduction of a series resistor in a high current leg of a circuit generates heat and dissipates a considerable amount of energy. Another important aspect of the present invention is to measure input current I1 without measuring the voltage across a series resistor. Accordingly, the starting and operating circuit includes an input current sensing circuit 22 for measuring currents I2 and I3 (FIG. 1) and computing I1 therefrom. Current I2, which represents the current through semiconductor switch Q2, is measured by means of a transformer T2A having a primary winding connected in series with inductance L2 and semiconductor switch Q2. A secondary winding of transformer T2A is connected to a series combination of a diode D5 and a resistor R4. Similarly, current I3, which represents the current through first capacitor C28 and the primary winding of power transformer T3 of dc-to-dc-converter 18, is measured by means of a transformer T2B having a primary winding connected in series with inductance L2 and capacitor C28. A secondary of transformer T2B is connected to a series combination of a diode D6 and a resistor R5. Transformers T2A and T2B step down currents I2 and I3, respectively, by a factor of 100. The signals from resistors R4 and R5 are coupled to pin 3 on U1 through resistors R3 and R6. Pin 3 on U1 is also coupled through diode D3 to a warm up power control circuit 44 to be described later.

Semiconductor switch Q2 of dc-to-dc converter 18 has a gate coupled to the output of a pulse width modulator (PWM) 24 comprising an integrated circuit U1 which includes an internal oscillator. The output frequency of U1, which may be 100 Khz., is predetermined by the proper selection of a resistor R1 and a capacitor C8. A reference voltage of 5 volts dc is provided by the PWM at pin 8 of U1. A bypass capacitor C34 is connected between pin 7 of U1 and ground. A series combination of a resistor R2 and a capacitor C11 is connected between pins 1 and 2 of U1. A bypass capacitor C9 connects a current sense (pin 3) of U1 to ground. A transistor Q1, having a collector terminal connected to pin 8 and an emitter terminal connected to a resistor R18, is used to resistively sum a fraction of an oscillator ramp with a current sense signal at pin 3 of U1 to provide slope compensation. A resistor R8 provides a discharge path for gate of semiconductor switch Q2 when U1 is shut down.

A power burst circuit 26 consisting of a series combination of a capacitor C14 and a resistor R27 is connected to pin 2 of U1 by means of a PWM controlling line VFB. Capacitor C14 and resistor R27 cause a momentary maximum power burst to the lamp for about 50 msecs. during lamp starting.

A series combination of diodes D11, D12, D13, D14, and D34 provide an output voltage clamp 28. Typically, when the output voltage exceeds a predetermined level (e.g., 600 volts), a shutdown signal is sent by way of diode D33 to line VFB to U1 of the pulse width modulator.

The output of dc-to-dc converter 18 is connected to an energy storage circuit 30 consisting of a charging resistor R12, a pair of capacitors C25, C26 and a pair of discharging resistors R13, R14. Energy storage circuit 30 provides a source of high voltage, high initial current energy necessary for proper glow-to-arc transition of the arc discharge lamp.

Referring to FIGS. 1 and 2, a radio-frequency interference (RFI) filter 32 consisting of inductance LF2, capacitors C44, C46 and a ferrite bead FB1 is coupled to the output of dc-to-dc converter 18. The output of this RFI filter is coupled to a high voltage spike generating circuit 34 comprising a spark gap SG1 having one end connected to the junction of a series-connected charging resistor R60 and capacitor C48. The other end of spark gap SG1 is connected to a pulse winding W1 of a trigger transformer T5. When dc power is first applied to input terminals IN1 and IN2, capacitor C48 charges through resistor R60 until the breakdown voltage of spark gap SG1 is reached. Spark gap SG1 may have a breakdown voltage of, for example, 350 volts. When the breakdown voltage is reached, spark gap SG1 conducts to complete the loop including capacitor C48 and winding W1 of transformer T5. The energy in capacitor C48 discharges through spark gap SG1 and pulse winding W1. The pulse voltage is increased by windings W2 and W3 of transformer T5 to a value of approximately 25-30 KV and applied across the anode and cathode terminals of the arc discharge lamp. This 25-30 KV spike causes a glow state in the lamp. A train of these high voltage spikes is produced only until lamp ignition occurs since the voltage developed across capacitor C48 during normal lamp operation is insufficient to cause further breakdown of spark gap SG1.

Preferably, windings W1, W2 and W3 of trigger transformer T5 are phased as illustrated in FIG. 2 so as to produce a negative-going, high-voltage spike across the lamp and thereby prevent attack of the quartz region of glass around the cathode and improve hot restriking.

As illustrated in FIG. 1, a voltage divide network includes of resistors R15, R16 and R17. This voltage divide network has a pair of junction points which provide inputs to an output voltage sensing circuit 36. Output voltage sensing circuit 36 includes a first comparator U3 (pins 10, 11 and 13) for sensing an output voltage greater than 200 volts. A second comparator U3 (pins 8, 9 and 14) senses an output voltage less than 10 volts. A diode D26 is connected across the input terminals of the first comparator. A diode D27, a capacitor C18 and resistors R52, R55 and R56 are coupled to the first and second comparators. The outputs of the first and second comparators are coupled by means of diodes D23 and D25, respectively, to the input of a latch comprising a comparator U3 (pins 2, 4 and 5). Input pin 5 of the latch is connected to an RC timer comprising a capacitor C17 and a pair of resistors R53, R54. The output of the latch (pin 2) is coupled through a resistor R38 to the base of a transistor Q3. The base of transistor Q3 is coupled to ground through a parallel combination of a resistor R58 and a capacitor C41. In operation, the latch sends a signal through transistor Q3 to pin 1 of pulse width modulator U1 if the output voltage is greater than 200 volts or less than 10 volts for an extended period of time (e.g., greater than 10 seconds) as established by the RC timer. This signal from the latch turns off power to the lamp by interrupting the pulse width modulator. The starting and operating circuit can be reset by briefly disconnecting the dc input voltage.

Lamp power control is achieved by summing two signals in a power control summing amplifier 40 according to the following equation:

Power signal $= K_1 I + K_2 V$, $K_1$ and $K_2$ are constants.

Power control summing amplifier 40 comprises an operational amplifier U4 (pins 1, 2 and 3) having one input coupled to lamp current sensing resistor R10 through a resistor R31. The other input of the operational amplifier is coupled to a lamp voltage sensing circuit 42 comprising a pair of resistors R11, R34 and to the output of warm-up power control circuits 38 and 44. The output of operational amplifier U4 (pins 1, 2 and 3) is coupled through a resistor R28 to the PWM control line VFB. Power control summing amplifier 40 further includes capacitors C15, C39 and resistors R29, R30 and R33.

To insure rapid warm-up of a cold lamp, it is advantageous to operate the lamp at an elevated power level for a brief period of time during start-up independent of lamp voltage. Accordingly, the starting and operating circuit employs a warm-up power control circuits 38 and 44 having separate RC timers associated therewith. The RC timer of warm-up power control circuit 38 includes a capacitor C21 that charges through a diode D18, and a pair of resistors R36, R37. The timer is connected to one of the input terminals of a voltage follower U4 (pins 8, 9 and 10). The output of the voltage follower is coupled through a resistor R32 to the input of power control summing amplifier 40. Using a lamp rated at 30 watts as an example, warm-up power control circuit 44 allows a cold lamp to operate at about 70 watts for a period of about 1 to 2 seconds. The lamp power is then decreased over a period of approximately 40 seconds until the rated power is reached. The shape of the power vs time curve is taylored to the warm up characteristics of the lamp.

Another important aspect of the invention is the fact that the starting and operating circuit of the invention remembers how long the lamp has been off and adjusts the initial lamp power upon hot restart. In this regard, operational amplifier U4 (pins 1, 2 and 3) of warm-up power control circuit 38 tracks the amount of time the lamp has been off by monitoring the voltage remaining on capacitors C19 and C21 at the beginning of a hot restart attempt. For example, if the lamp is hot restarted after a brief off period, the initial power to the hot lamp will be adjusted to a level between the rated lamp wattage and the maximum cold start wattage. The particular wattage level is determined by the actual voltage remaining across capacitors C19 and C21 at the time of restart.

Input current I1 is prevented from exceeding a limit of 10 amps for more than 5 seconds during starting and a limit of 5 amps thereafter by circuit 44 which includes an RC timer comprising a timing capacitor C19. Timing capacitor C19 charges through a resistor R49 and a diode D28 and through a resistor R48. The voltage across capacitor C19 is measured with a high impedance by means of a voltage follower U4 (pins 12, 13 and 14). The voltage follower is referenced to the junction of a pair of resistors R50 and R51 in order to achieve the required power/time curve to the lamp.

It is noted that the voltage across capacitor C19 does not stop charging at 5 volts but continues to charge to 13 volts. In order to limit the input signal to power control summing amplifier 40 to 5 volts, the output of the voltage follower of circuit 44 is coupled through a resistor R45 to one of the input terminals of a precision voltage clamp comprising an operational amplifier U4 (pins 5, 6 and 7). The other input terminal of the precision clamp is referenced to 5 volts.

A diode D20, connected to the output of the precision voltage clamp, limits the voltage signal and prevents lamp current from going below a certain value.

The dc input voltage is monitored by a circuit 46 comprising a comparator U3 (pins 1, 6 and 7). One of the input terminals of the comparator is coupled to the dc input filter (capacitor C4 and C5) by means of a resistor R23. The output of this comparator is coupled through a diode D16 to U1 of the pulse width modulator by way of line VFB. The dc input voltage monitoring circuit 46 further includes a capacitor C12 and resistors R24, R25 and R26. In operation, if the dc input voltage is greater than a predetermined level (e.g., 19 volts), a signal from circuit 46 shuts down pulse width modulator 24. As a result, power to the lamp is discontinued until the input voltage falls to the rated input range, protecting the circuitry from high voltage inputs.

The operation of an arc discharge lamp on the starting and operating circuit of the present invention will now be described.

As a specific example but in no way to be construed as a limitation, the following components are appropriate to an embodiment of the present disclosure, as illustrated in FIGS. 1 and 2:

| Item | Description | Value |
| --- | --- | --- |
| R7 | Resistor | 15 ohm |
| R46 | Resistor | 680 ohm |
| R3, R6, R50, R58 | Resistors | 1K ohm |
| R22 | Resistor | 1.2K ohm |
| R19 | Resistor | 1.5K ohm |
| R47 | Resistor | 2.2K ohm |
| R27 | Resistor | 2.7K ohm |
| R18, R56 | Resistors | 3.3K ohm |
| R51 | Resistor | 3.9K ohm |
| R24, R39, R45 | Resistors | 4.7K ohm |
| R1 | Resistor | 8.2K ohm |
| R8, R28, R38, R55 | Resistors | 10K ohm |
| R21, R23, R26 | Resistors | 12K ohm |
| R2, R40, R41 | Resistors | 22K ohm |
| R43, R44 | Resistors | 27K ohm |
| R17 | Resistor | 39K ohm |
| R16, R52 | Resistors | 47K ohm |
| R49 | Resistor | 82K ohm |
| R53, R54 | Resistors | 100K ohm |
| R36, R37 | Resistors | 180K ohm |
| R42, R48 | Resistors | 470K ohm |
| R33 | Resistor | 3.32K ohm, 1% |
| R31 | Resistor | 4.99K ohm, 1% |
| R29 | Resistor | 9.09K ohm, 1% |
| R34 | Resistor | 33.2K ohm, 1% |
| R32, R35 | Resistors | 100K ohm, 1% |
| R11 | Resistor | 909K ohm, 1% |
| R5, R9 | Resistors | 24 ohm |
| R4 | Resistor | 27 ohm |
| R20 | Resistor | 47 ohm |
| R57 | Resistor | 1K ohm |
| R13, R14, R25 | Resistors | 100K ohm, 1 watt |
| R12 | Resistor | 1K ohm, 1/2 watt |
| R15 | Resistor | 1M ohm, 1/2 watt |
| R30 | Resistor | 2K pot. |
| R10 | Resistor | 1 ohm, 3 watt |
| R60 | Resistor | 1M ohm |
| U1 | IC | UC1843J |
| U2 | IC | LT1072MJ8 |
| U3 | IC | LM139J |
| U4 | IC | LM124J |
| C39 | Capacitor | 100 pf, 50 V |
| C2, C7 | Capacitors | 1 mfd, 63 V |
| C1, C6, C10, C15, C16, C23, C34, C35, C38 | Capacitors | .47 mfd, 50 v |
| C24 | Capacitors | .15, 1500 V |
| C27, C37 | Capacitors | .1 mfd, 50 V |
| C12, C18, C40, C41 | Capacitors | .01 uf, 50 V |
| C11 | Capacitor | .047 mfd, 50 V |
| C28 | Capacitor | 10 mfd, 50 V |
| C17, C19, C21 | Capacitors | 100 mfd 16 V |
| C20, C36 | Capacitors | 47 mfd, 25 V |
| C14 | Capacitor | 2.2 mfd, 50 V |
| C25, C26 | Capacitors | 2.2 mfd, 350 V |
| C29 | Capacitor | .33 mfd, 500 V |
| C3, C4, C5 | Capacitors | 1000 mfd, 25 V |
| C8 | Capacitor | .0022 mfd, 50 V |
| C9, C13 | Capacitors | .001 mfd, 100 V |
| C48 | Capacitor | 0.33 mfd |
| LF1, C0 | EMI Filter | 9050-100-0008 |
| LF2, C44, C46 | EMI Filter | 1202-005 |
| Q1, Q3 | Transistors | 2N3904 |
| Q2 | Transistor | IRF540 Mosfet |
| D12, D13, D14 | Zener Diodes | 200 V, 50 W |
| D34 | Zener Diode | 5.1 V, 1 W |
| D1, D30 | Diodes | MR2535 |
| D29 | Diode | MBR2545CT |
| D6, D7, D16-28, D33 | Diodes | 1N4148 |
| D5, D10, D11 | Diodes | BYV26C |
| D8 | Diode | BYM26C |
| D9 | Diode | BYM26E |
| D4 | Diode | 1N4745A |
| D15 | Diode | 1N5819 |
| D3 | Diode | BAT85 |
| L1 | Inductor | 27T #18 |
| L2 | Inductor | 35T #19 red/#21 green |
| L3 | Inductor | 175T #25 Heavy GP |
| T1 | Transformer | 60T (2 strands #32 red/green) |
| T2A, T2B | Transformers | 100T #32 secondary, 1T primary, 2 piece unit w/ct primary |
| T3 | Transformer | 3 × 8T (4 strands #28 HSDN)primary, 54T w/Ct #26 secondary |
| T4 | Transformer | 15T 2#28 Nylon on 1041TO60-3E2A Torroid |
| T5 | Transformer | |
| FBI | Ferrite Bead | 2673021801 |

There has thus been shown and described an improved starting and operating circuit suitable for low voltage applications such as a ballast for HID automotive headlights. The starting and operating circuit wherein the light output from a lamp operating on the circuit is not dependent upon the lamp's voltage.

While there have been shown and described what are at present considered to be the preferred embodiments of the invention, it will be apparent to those skilled in the art that various changes and modifications can be made herein without departing from the scope of the invention. For example, in order to minimize the size of the circuit, most of the components can be fabricated on one or more custom integrated chips. Therefore, the aim in the appended claims is to cover all such changes and modifications as fall within the true spirit and scope of the invention.

What is claimed is:

1. A circuit for starting and operating an arc discharge lamp comprising:
   first and second direct current input terminals;
   dc-to-dc converter coupled to said first and second direct current input terminals and including semiconductor switch means, a first transformer having a primary winding coupled to a first capacitor and a secondary winding coupled to a second capacitor, and a first diode having one end thereof coupled to said second capacitor;
   pulse width modulator means including high frequency generating means for developing a signal for driving said semiconductor switch means of said dc-to-dc converter;
   reverse recovery means including a second diode, a filter capacitor and a second transformer having a primary winding and a secondary winding, said primary winding of said second transformer being in series with said first diode of said dc-to-dc converter, said secondary winding of said second transformer being coupled to said second diode and said filter capacitor, the output of said reverse recovery means being coupled to the input of said dc-to-dc converter;
   a power control summing amplifier coupled to said dc-to-dc converter and having first and second inputs;
   voltage and current sensing means for developing a pair of control signals and means for coupling said control signals respectively to said first and second inputs of said power control summing amplifier;
   warm-up power control means for operating an arc discharge lamp at an elevated power level for a predetermined period of time during start-up of said lamp, said warm-up power control means including means for tracking the amount of time said lamp is off and means for adjusting the initial lamp power to a hot lamp to a level between a rated lamp wattage and a maximum cold start wattage; and
   input current sensing means including a third transformer having a primary winding in series with said semiconductor switch means of said dc-to-dc converter and a fourth transformer having a primary winding in series with said first capacitor of said dc-to-dc converter, said first and second transformers having secondary windings coupled to said warm-up power control means.

2. The starting and operating circuit of claim 1 wherein one end of said second diode of said reverse recovery means is connected to one end of said secondary winding of said second transformer, the other end of said second diode being connected to one end of said filter capacitor, the other end of said filter capacitor being coupled to the other end of said secondary winding of said second transformer.

3. The starting and operating circuit of claim 1 wherein said warm-up power control means includes a pair of timers, each of said timers comprising a resistor and a capacitor.

4. The starting and operating circuit of claim 1 wherein said second and third transformers of said input current sensing means have a primary-to-secondary ratio of 1:100.

5. A circuit for starting and operating an arc discharge lamp comprising:
   first and second direct current input terminals;
   dc-to-dc converter coupled to said first and second direct current input terminals and including semiconductor switch means, a first transformer having a primary winding coupled to a first capacitor and a secondary winding coupled to a second capacitor, and a first diode having one end thereof coupled to said second capacitor;
   pulse width modulator means including high frequency generating means for developing a signal for driving said semiconductor switch means of said dc-to-dc converter;
   reverse recovery means including a second diode, a filter capacitor and a second transformer having a primary winding and a secondary winding, said primary winding of said second transformer being in series with said first diode of said dc-to-dc converter, said secondary winding of said second transformer being coupled to said second diode and said filter capacitor, the output of said reverse recovery means being coupled to the input of said dc-to-dc converter;
   a power control summing amplifier coupled to said dc-to-dc converter and having first and second inputs;
   voltage and current sensing means for developing a pair of control signals and means for coupling said control signals respectively to said first and second inputs of said power control summing amplifier; and
   warm-up power control means for operating an arc discharge lamp at an elevated power level for a predetermined period of time during start-up of said lamp, said warm-up power control means including means for tracking the amount of time said lamp is off and means for adjusting the initial lamp power to a hot lamp to a level between a rated lamp wattage and a maximum cold start wattage.

6. The starting and operating circuit of claim 5 wherein one end of said second diode of said reverse recovery means is connected to one end of said secondary winding of said second transformer, the other end of said second diode being connected to one end of said filter capacitor, the other end of said filter capacitor being coupled to the other end of said secondary winding of said second transformer.

7. A circuit for starting and operating an arc discharge lamp comprising:
   first and second direct current input terminals;
   dc-to-dc converter coupled to said first and second direct current input terminals and including semiconductor switch means, a first transformer having a primary winding coupled to a first capacitor and a secondary winding coupled to a second capacitor, and a first diode having one end thereof coupled to said second capacitor;
   pulse width modulator means including high frequency generating means for developing a signal for driving said semiconductor switch means of said dc-to-dc converter;
   a power control summing amplifier coupled to said dc-to-dc converter and having first and second inputs;
   voltage and current sensing means for developing a pair of control signals and means for coupling said control signals respectively to said first and second inputs of said power control summing amplifier;
   warm-up power control means for operating an arc discharge lamp at an elevated power level for a predetermined period of time during start-up of said lamp, said warm-up power control means including means for tracking the amount of time said lamp is off and means for adjusting the initial lamp power to a hot lamp to a level between a rated lamp wattage and a maximum cold start wattage; and input current sensing means including a second transformer having a primary winding in series with said semiconductor switch means of said dc-to-dc converter and a third transformer having a primary winding in series with said first capacitor of said dc-to-dc converter, said second and third transformers having secondary windings coupled to said warm-up power control means.

8. The starting and operating circuit of claim 7 wherein said second and third transformers of said input current sensing means have a primary-to-secondary ratio of 1:100.

9. The starting and operating circuit of claim 7 wherein said warm-up power control means includes a pair of timers, each of said timers comprising a resistor and a capacitor.

* * * * *